United States Patent
Nag et al.

(10) Patent No.: US 10,628,458 B2
(45) Date of Patent: Apr. 21, 2020

(54) SYSTEMS AND METHODS FOR AUTOMATED RECOMMENDATIONS

(71) Applicant: WAL-MART STORES, INC., Bentonville, AR (US)

(72) Inventors: Kaushiki Nag, Santa Clara, CA (US); Sushant Kumar, Sunnyvale, CA (US); Venkata Syam Prakash Rapaka, Cupertino, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 317 days.

(21) Appl. No.: 15/420,852

(22) Filed: Jan. 31, 2017

(65) Prior Publication Data

US 2018/0218063 A1    Aug. 2, 2018

(51) Int. Cl.
G06F 17/30    (2006.01)
G06F 16/28    (2019.01)
H04L 29/08    (2006.01)

(52) U.S. Cl.
CPC ........... G06F 16/285 (2019.01); H04L 67/02 (2013.01); H04L 67/22 (2013.01); H04L 67/306 (2013.01)

(58) Field of Classification Search
CPC ........ G06F 16/285; H04L 67/02; H04L 67/22
See application file for complete search history.

(56) References Cited

U.S. PATENT DOCUMENTS

| | | | |
|---|---|---|---|
| 7,072,888 B1 | 7/2006 | Perkins | |
| 7,752,054 B1 | 7/2010 | Anthony-Hoppe et al. | |
| 7,801,885 B1 | 9/2010 | Verma | |
| 7,827,170 B1 * | 11/2010 | Horling | G06F 16/24578 |
| | | | 707/722 |
| 9,047,870 B2 * | 6/2015 | Ballinger | G10L 15/30 |
| 10,037,357 B1 * | 7/2018 | Donaker | G06F 16/2457 |
| 2002/0002538 A1 | 1/2002 | Ling | |
| 2003/0100931 A1 | 5/2003 | Mullett | |
| 2003/0149937 A1 | 8/2003 | McElfresh et al. | |
| 2005/0102202 A1 | 5/2005 | Linden et al. | |
| 2005/0125382 A1 * | 6/2005 | Karnawat | G06F 16/9535 |
| 2006/0204142 A1 | 9/2006 | West et al. | |
| 2007/0192166 A1 | 8/2007 | Van Luchene | |
| 2009/0044106 A1 | 2/2009 | Berkner et al. | |
| 2009/0248608 A1 | 10/2009 | Ravikumar et al. | |

(Continued)

*Primary Examiner* — Syed H Hasan
(74) *Attorney, Agent, or Firm* — Bryan Cave Leighton Paisner LLP

(57) ABSTRACT

In some embodiments, the method can comprise receiving one or more clicks on one or more items by a user during a browse session, measuring a distance between the one or more items, and determining a relationship between the one or more items based at least in part on the distance. In various embodiments, the method can further comprise clustering the one or more items based at least in part on the relationship into one or more clusters and presenting to the user a recommendation. In a number of embodiments, the recommendation can comprise at least one of one or more search terms related to at least one cluster of the one or more clusters or a set of items related to the at least one cluster of the one or more clusters, the set of items comprising at least a portion of the one or more items. Other embodiments of related methods and systems are also provided.

20 Claims, 9 Drawing Sheets

(56) References Cited

U.S. PATENT DOCUMENTS

| | | |
|---|---|---|
| 2009/0307002 A1 | 12/2009 | Costanzo et al. |
| 2010/0125573 A1 | 5/2010 | Venolia |
| 2010/0250714 A1 | 9/2010 | Wehrmann et al. |
| 2011/0035379 A1 | 2/2011 | Chen |
| 2011/0078554 A1 | 3/2011 | Nie et al. |
| 2011/0184806 A1 | 7/2011 | Chen et al. |
| 2011/0238478 A1 | 9/2011 | Gottfurcht et al. |
| 2011/0307411 A1 | 12/2011 | Bolivar et al. |
| 2012/0036123 A1 | 2/2012 | Hasan et al. |
| 2012/0042232 A1 | 2/2012 | Brelsford et al. |
| 2012/0143789 A1 | 6/2012 | Wang et al. |
| 2012/0173338 A1* | 7/2012 | Ariel ............... G06Q 30/02 705/14.53 |
| 2012/0226562 A1 | 9/2012 | Baum et al. |
| 2012/0284275 A1* | 11/2012 | Vadrevu ............ G06F 16/358 707/738 |
| 2012/0317088 A1* | 12/2012 | Pantel ............... G06F 16/972 707/706 |
| 2013/0013448 A1 | 1/2013 | Bradley et al. |
| 2013/0282682 A1 | 10/2013 | Batraski et al. |
| 2014/0122464 A1* | 5/2014 | Arunachalam ..... G06F 16/9535 707/723 |
| 2014/0149399 A1 | 5/2014 | Kurzion |
| 2014/0279233 A1 | 9/2014 | Lau et al. |
| 2014/0279993 A1 | 9/2014 | Bernhardt et al. |
| 2014/0304278 A1* | 10/2014 | Kleiman ............ G06F 16/583 707/749 |
| 2014/0337171 A1 | 11/2014 | Sivashanmugam et al. |
| 2015/0007064 A1 | 1/2015 | Givoni |
| 2015/0066597 A1 | 3/2015 | Givoni |
| 2015/0127439 A1 | 5/2015 | Campos de Figueiredo Faceira et al. |
| 2016/0140130 A1* | 5/2016 | Smirnov ............ G06F 16/3325 707/740 |
| 2016/0232575 A1 | 8/2016 | Kirti et al. |
| 2016/0306798 A1 | 10/2016 | Guo et al. |
| 2016/0321716 A1 | 11/2016 | Ravikant et al. |
| 2017/0026703 A1* | 1/2017 | Phadnis ............. G06Q 30/02 |
| 2017/0171580 A1* | 6/2017 | Hirsch .............. H04N 21/252 |
| 2017/0223406 A1 | 8/2017 | Kaliamoorthi et al. |
| 2018/0060936 A1 | 3/2018 | Gupta et al. |
| 2018/0096399 A1 | 4/2018 | Delayen et al. |
| 2018/0108093 A1 | 4/2018 | Podgorny et al. |
| 2018/0181569 A1 | 6/2018 | Jarr et al. |

* cited by examiner

500

505 – Receiving a search query from a search by a user during a browse session.

510 - Receiving one or more items from an item database in response to the search query.

515 - Receiving one or more previous search queries from a search database, the one or more previous search queries related to the search query.

520 - Determining a purchase probability associated with a first item of the one or more items based at least in part on a first item score for the first item.

525 - Ranking the one or more items based at least in part on the purchase probability associated with the first item of the one or more items.

530 - Facilitating display of one or more items on a webpage.

FIG. 5

700
705 – Receiving a search query from a search by a user.
710 - Determining a question to present to the user.
715 - Presenting the question to the user when a confidence score associated with the question reaches or exceeds a predetermined threshold.
FIG. 7

800

805 – Storing one or more user actions of a user of one or more users in a database.

810 - Sorting the one or more user actions into one or more user action types.

815 - Extracting one or more correlated signals related to the one or more user actions of the user of the one or more users based at least in part on the one or more user action types to determine one or more independent signals related to the one or more user actions of the user of the one or more users.

820 - Averaging the one or more independent signals related to the one or more user actions of the user to determine a personalization score related to the user of the one or more users.

825 - Applying a weighted average on the average vector of one or more independent signals to get a personalization score.

830 - Updating a webpage for the user based at least in part on the personalization score.

905 – Receiving one or more online activities of a user.

910 – Determining one or more questions associated with the one or more online activities of the user.

915 – Classifying the one or more questions into one or more tiers.

920 – Building a model, wherein the model predicts a probability associated with each of the one or more questions.

925 – Presenting at least one of the one or more questions to the user based at least in part on the probability of each of the one or more questions.

930 – Updating the model based at least in part on feedback from the user.

FIG. 9

SYSTEMS AND METHODS FOR AUTOMATED RECOMMENDATIONS

TECHNICAL FIELD

This disclosure relates generally to systems for automated recommendations, and related methods.

BACKGROUND

System bandwidth can become slow or bottlenecked when retrieving search results for a search query. Many times, when a user of a website, such as an eCommerce website, has difficulty finding an item, the user can conduct numerous user actions and/or item activities (e.g., clicking on one or more items or entering new search terms). These user actions and/or item activities can decrease the efficiency of a system by increasing the amount of item information retrieved from a database. The ability to provide automated and/or personalized recommendations can decrease the demand on system resources and improve user experience. Accordingly, there is a need for systems and methods to provide for automated recommendations.

BRIEF DESCRIPTION OF THE DRAWINGS

To facilitate further description of the embodiments, the following drawings are provided in which:

FIG. 5 illustrates is a flowchart for a method, according to an embodiment;

FIG. 7 illustrates a flowchart for yet another method, according to yet another embodiment;

FIG. 8 illustrates a flowchart for another method, according to still yet another embodiment; and FIG. 9 illustrates a flowchart for another method, according to another embodiment.

Figure 1:
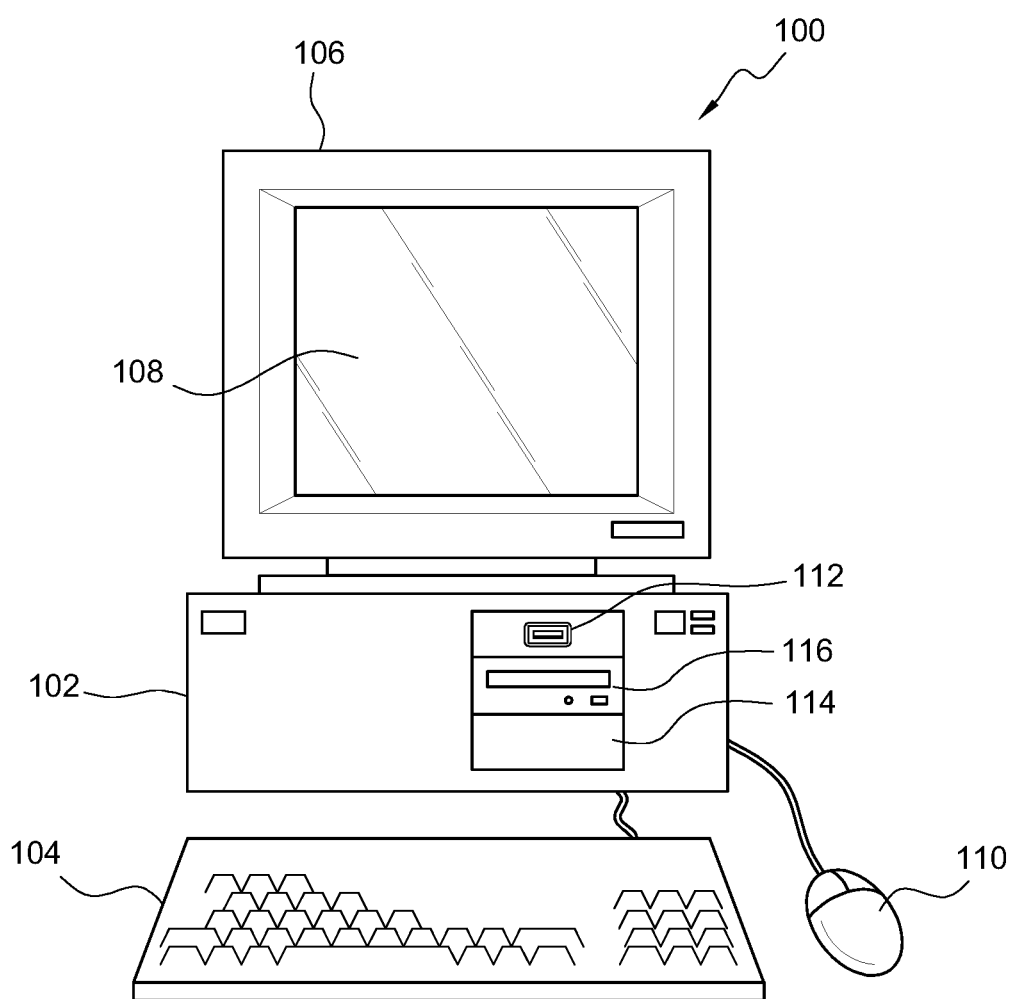
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a system. In many embodiments, the system can comprise one or more processing modules and one or more non-transitory storage modules storing computing instructions configured to run on the one or more processing modules and perform acts. In many embodiments, the acts can comprise receiving a search query from a search by a user during a browse session, receiving one or more items from an item database in response to the search query, and receiving one or more previous search queries from a search database, the one or more previous search queries related to the search query. In many embodiments, the acts can further comprise determining a purchase probability associated with a first item of the one or more items based at least in part on a first item score for the first item, ranking the one or more items based at least in part on the purchase probability associated with the first item of the one or more items, and facilitating display of the ranking of the one or more items.

In some embodiments, a method can comprise receiving a search query from a search by a user during a browse session, receiving one or more items from an item database in response to the search query, and receiving one or more previous search queries from a search database, the one or more previous search queries related to the search query. In many embodiments, the method can further comprise determining a purchase probability associated with a first item of the one or more items based at least in part on a first item score for the first item, ranking the one or more items based at least in part on the purchase probability associated with the first item of the one or more items, and facilitating display of the ranking of the one or more items.

Various embodiments can include a method. In many embodiments, the method can comprise processing data associated with a user of a plurality of users from a browse session by: (1) determining one or more first keywords by capturing the one or more first keywords associated with a search query of the user of the plurality of users during a time window; (2) determining one or more items by capturing the one or more items associated with the search query of the user of the plurality of users; (3) creating a feature set of data associated with at least a portion of the plurality of users; (4) creating a text corpus comprising: a search query of the user of the plurality of users and an item activity associated with the browse session; (5) clustering a search set based at least in part on the one or more first keywords; and (6) clustering an item set comprising the one or more items. In many embodiments, the method can further comprise determining an item vector representation representing the item set, determining a keyword vector representation representing the search set, and determining a first set of items of the item set as being associated with the search query based at least in part on the item vector representation and the keyword vector representation. In various embodiments, the method can further comprise determining a purchase probability associated with a first item of the first set of items of the item set based at least in part on a first item score for the first item, ranking the first set of items based at least in part on the purchase probability associated with the first item of the first set of items of the item set, and facilitating display of the ranking of the first set of items.

Various embodiments comprise a system. In many embodiments, the system can comprise one or more processing modules and one or more non-transitory storage modules storing computing instructions configured to run on the one or more processing modules and perform acts. In many embodiments, the acts can comprise receiving one or more clicks on one or more items by a user during a browse session, measuring a distance between the one or more items, and determining a relationship between the one or more items based at least in part on the distance. In some embodiments, the acts can further comprise clustering the one or more items based at least in part on the relationship into one or more clusters and presenting to the user a recommendation. In many embodiments, the recommendation can comprise at least one of one or more search terms related to at least one cluster of the one or more clusters or a set of items related to the at least one cluster of the one or more clusters, the set of items comprising at least a portion of the one or more items.

Many embodiments can comprise a method. In some embodiments, the method can comprise receiving one or more clicks on one or more items by a user during a browse session, measuring a distance between the one or more items, and determining a relationship between the one or more items based at least in part on the distance. In various embodiments, the method can further comprise clustering the one or more items based at least in part on the relationship into one or more clusters and presenting to the user a recommendation. In a number of embodiments, the recommendation can comprise at least one of one or more search terms related to at least one cluster of the one or more clusters or a set of items related to the at least one cluster of the one or more clusters, the set of items comprising at least a portion of the one or more items.

Some embodiments can comprise a method. In many embodiments, the method can comprise receiving one or more clicks on one or more items by a user during a browse session and updating a user profile of the user based at least in part on the one or more clicks on the one or more items by the user. In many embodiments, the method can further comprise clustering the one or more items by measuring a distance between the one or more items and determining a relationship between the one or more items based at least in part on the distance. In some embodiments, the method can further comprise presenting to a user one or more search terms related to a cluster of items, which are based at least in part on the relationship, and updating the user profile of the user again when the user clicks on at least one of the one or more search terms.

Various embodiments comprise a system. In many embodiments the system can comprise one or more processing modules and one or more non-transitory storage modules storing computing instructions configured to run on the one or more processing modules and perform acts. In some embodiments, the acts can comprise receiving a search query from a search by a user and determining a question to present to the user. In many embodiments, determining the question to present to the user can comprise evaluating a user profile associated with the user, evaluating the search query, evaluating one or more user actions during a current browse session of the user, and selecting the question from a set of questions. In some embodiments, the acts can further comprise presenting the question to the user when a confidence score associated with the question reaches or exceeds a predetermined threshold.

Some embodiments can comprise a method. In many embodiments, the method can comprise receiving a search query from a search by a user and determining a question to present to the user. In many embodiments, determining the question to present to the user can comprise evaluating a user profile associated with the user, evaluating the search query, evaluating one or more user actions during a current browse session of the user, and selecting the question from a set of questions. In some embodiments, the method can further comprise presenting the question to the user when a confidence score associated with the question reaches or exceeds a predetermined threshold.

Many embodiments can comprise a method. In some embodiments, the method can comprise determining a set of questions associated with a campaign by extracting text from one or more advertisements. In some embodiments, the method can further comprise determining a question from the set of questions to present to a user by evaluating a user profile associated with the user, evaluating a search query from the user, evaluating one or more user actions during a current browse session of the user, and selecting the question from the set of questions. In a number of embodiments, the method can further comprise presenting the question to the user when a confidence score associated with the question reaches or exceeds a predetermined threshold.

Various embodiments can comprise a system. In some embodiments, the system can comprise one or more processing modules and one or more non-transitory storage modules storing computing instructions configured to run on the one or more processing modules and perform acts. In many embodiments, the acts can comprise storing one or more user actions of a user of one or more users in a database, sorting the one or more user actions into one or more user action types, and extracting one or more correlated signals related to the one or more user actions of the user of the one or more users based at least in part on the one or more user action types to determine one or more independent signals related to the one or more user actions of the user of the one or more users. In some embodiments, the acts can further comprise averaging the one or more independent signals related to the one or more user actions of the user of the one or more users to determine a personalization score related to the user of the one or more users and updating a webpage for the user of the one or more users based at least in part on the personalization score.

Some embodiments can comprise a method. In many embodiments, the method can comprise storing one or more user actions of a user of one or more users in a database, sorting the one or more user actions into one or more user action types, and extracting one or more correlated signals related to the one or more user actions of the user of the one or more users based at least in part on the one or more user action types to determine one or more independent signals related to the one or more user actions of the user of the one or more users. In some embodiments, the method can further comprise averaging the one or more independent signals related to the one or more user actions of the user of the one or more users to determine a personalization score related to the user of the one or more users and updating a webpage for the user of the one or more users based at least in part on the personalization score.

A number of embodiments can comprise a method. In some embodiments, the method can comprise updating a user profile of a user of one or more users based at least in part on a determination of a personalization score of the user of the one or more users. In many embodiments, determining the personalization score of the user of the one or more users can comprise storing one or more user actions of the user of the one or more users in a database, sorting the one or more user actions into one or more user action types, extracting one or more correlated signals related to the one or more user actions of the user of the one or more users based at least in part on the one or more user action types to determine one or more independent signals related to the one or more user actions of the user of the one or more users, and averaging the one or more independent signals related to the one or more user actions of the user to determine the personalization score related to the user of the one or more users.

Figure 2:
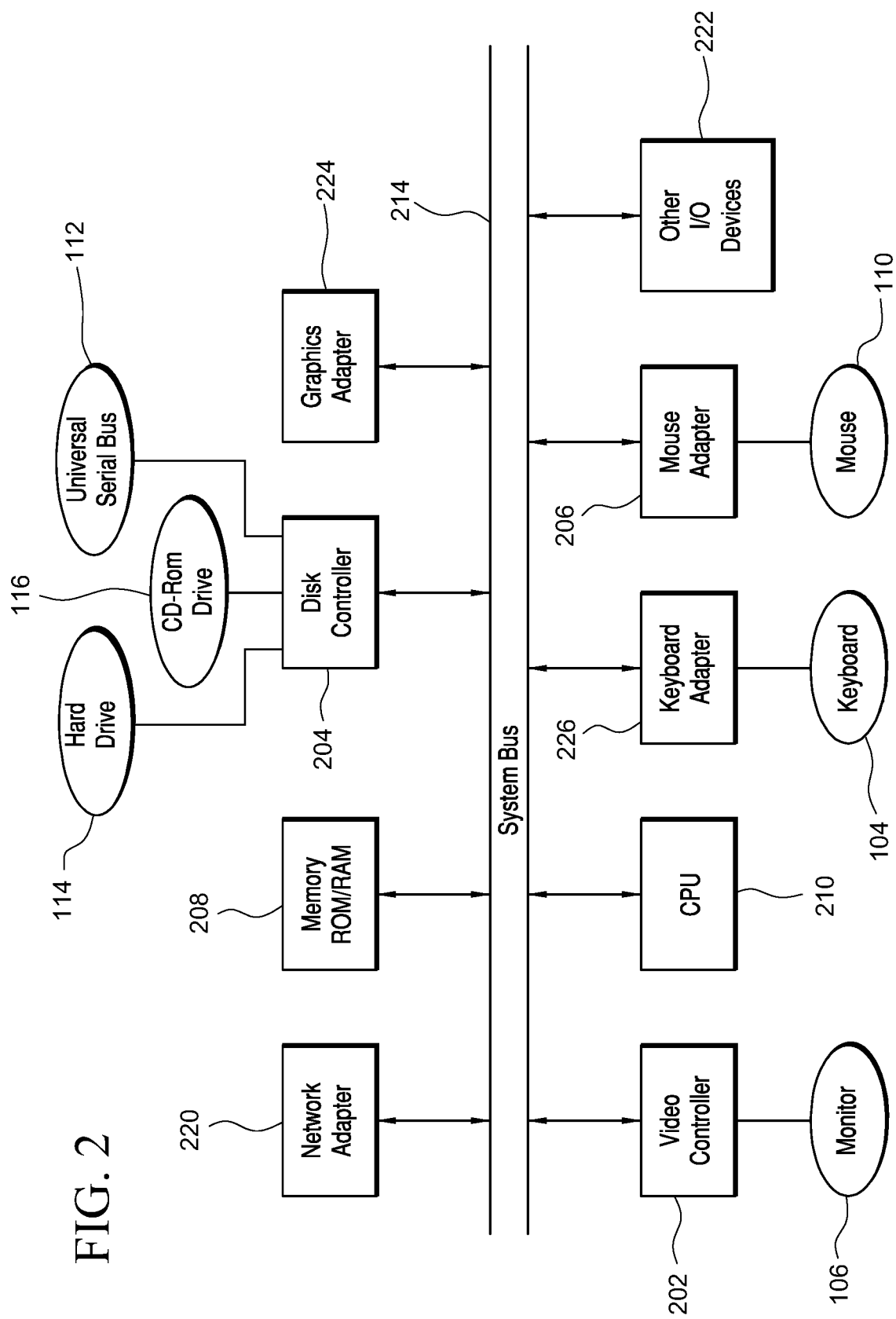
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with a CD-ROM and/or DVD drive 116 (FIGS. 1-2), floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
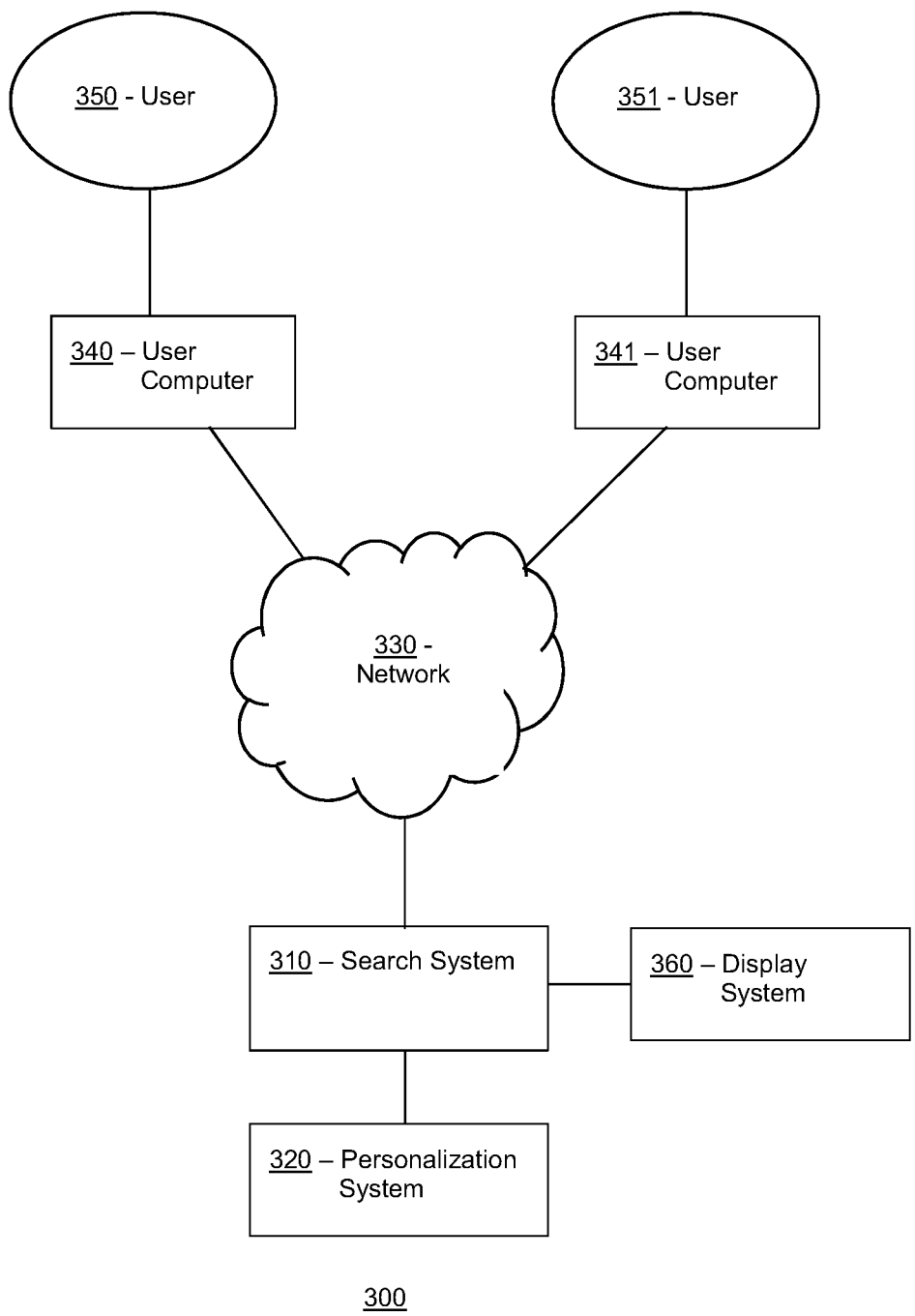
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise a search system 310, a personalization system 320, and a display system 360. In some embodiments, search system 310, personalization system 320, and display system 360 can each be a computer system 100 (FIG. 1), as described above, and can each be a single computer, a single server, or a cluster or collection of computers or servers. In some embodiments, search system 310 and/or personalization system 320 can be in communication with an inventory database (not shown) which can track distinct items (e.g., stock keeping units (SKUs)), and images of the distinct items, in a product catalog, which can be ordered through the online retailer and which can be housed at one or more warehouses. In many embodiments, warehouses can comprise brick-and-mortar stores, distribution centers, and/or other storage facilities.

In many embodiments, search system 310, personalization system 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of search system 310, personalization system 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of search system 310, personalization system 320, and/or display system 360. In a similar manner, the processing module(s) and the memory storage module(s) can be local and/or remote to each other.

In many embodiments, search system 310 and/or display system 360 can be configured to communicate with one or more user computers 340 and 341. In some embodiments, user computers 340 and 341 also can be referred to as customer computers. In some embodiments, search system 310 and/or display system 360 can communicate or interface (e.g. interact) with one or more customer computers (such as user computers 340 and 341) through a network 330. In some embodiments, network 330 can be an internet, an intranet that is not open to the public, an email system, and/or a texting system. In many embodiments, network 330 can comprise one or more electronic transmission channels. In many embodiments, the electronic transmission channels can comprise an email, a text message, and/or an electronic notice or message. Accordingly, in many embodiments, search system 310 and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, search system 310, personalization system 320, and/or display system 360 also can be configured to communicate with one or more databases. The one or more database can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between search system 310, personalization system 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
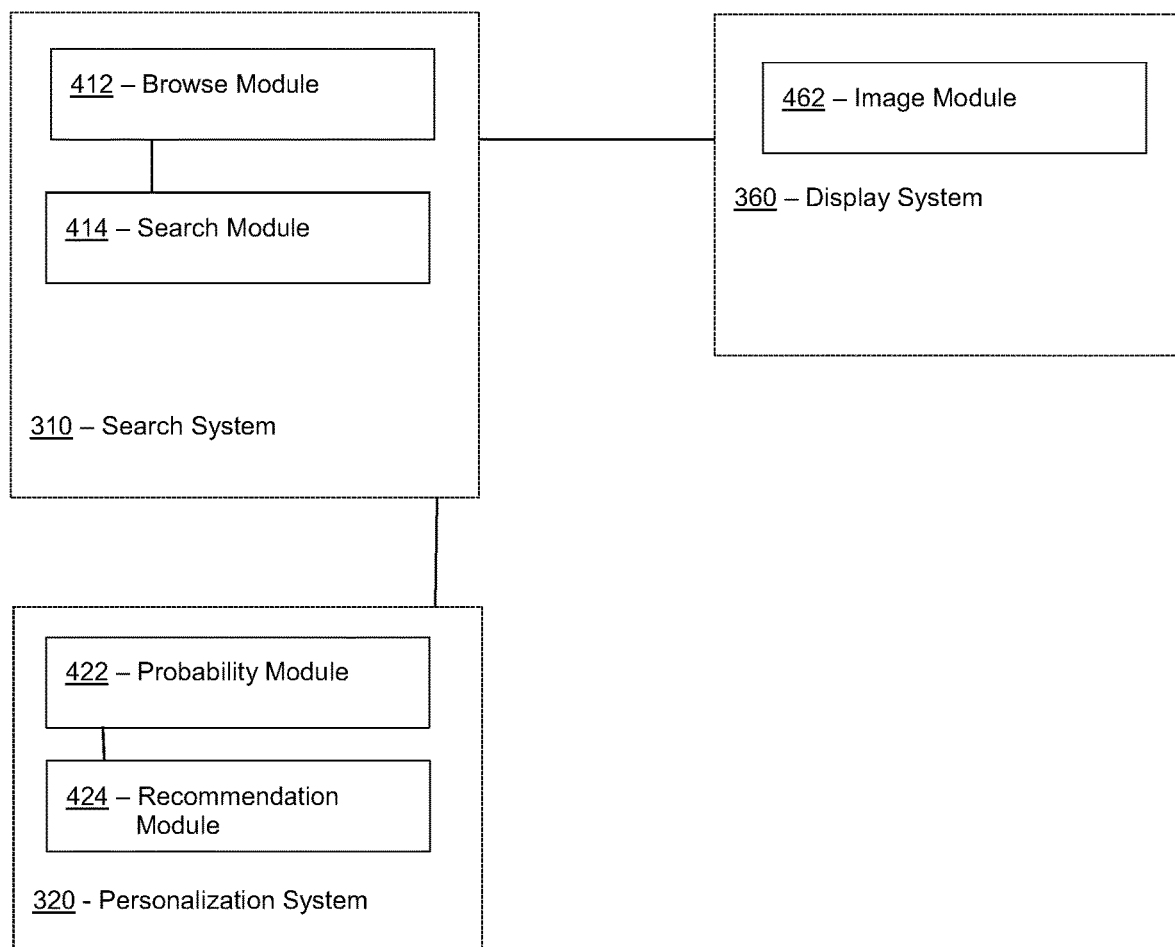
FIG. 4 illustrates a representative block diagram of a portion of the system of FIG. 3, according to an embodiment.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 412, 414, 422, 424, and/or 462 (FIG. 4). Such non-transitory memory storage modules can be part of a computer system such as search system 310 (FIGS. 3 & 4), personalization system 320

(FIGS. 3 & 4), and/or display system 360 (FIGS. 3 & 4). The processing module(s) can be similar or identical to the processing module(s) described above with respect to computer system 100 (FIG. 1). In many embodiments, method 500 can be similar to method 600 (FIG. 6), method 700 (FIG. 7), and/or method 800 (FIG. 8). In many embodiments, portions of method 600 (FIG. 6), method 700 (FIG. 7), method 800 (FIG. 8) and/or method 900 (FIG. 9) can be used within method 500.

In many embodiments, method 500 can be a method to personalize a web page based on user intent, information from search query (e.g., search terms) and/or other item activity. For example, method 500 can comprise an activity 505 of receiving a search query from a search by a user during a browse session. In some embodiments, the browse session can comprise a time period spent on a website and/or other third party websites. In some embodiments, the time period can be approximately 1 second to approximately 1 hour. In some embodiments, the time period can be the time that the user is logged into a session. In some embodiments, the time period can be from when the user logs into a session to when the user closes a browser. In some embodiments, receiving the search query from the search by the user can comprise receiving the search query during a time window. In some embodiments, the time window can comprise the browse session time period. In some embodiments, the time window can comprise a number of item activity associated with the browse session. In various embodiments, the item activity associated with the browse session can comprise at least one of a view of an item of the item set, a click on the item of the item set, an add-to-cart of the item of the item set, or a purchase of the item of the item set. In a number of embodiments, the time window can comprise a number of actions, subsequent to the search query, associated with item activity associated with the browse session (e.g., a number of clicks on one or more items, a number of views of one or more items, a number of items added to the checkout cart, and/or a number of purchases of one or more items). In some embodiments the number of subsequent actions can comprise a combination of a number of item activities. In some embodiments, the number of subsequent actions can comprise approximately 1 to 100 item activities.

In many embodiments, method 500 can further comprise an activity 510 of receiving one or more items from an item database in response to the search query. In some embodiments, method 500 can further comprise an activity 515 of receiving one or more previous search queries from a search database, the one or more previous search queries related to the search query. An advantage of activity 515 of receiving one or more previous search queries from a search database, the one or more previous search queries related to the search query, can comprise expanding a source of information associated with previous search queries for one or more searches related to the search query. The source of information can comprise when an other user searched for a related search query and the item activity associated to the other user's search for the related search query.

In various embodiments, method 500 can further comprise an activity of processing data associated with at least a portion of a plurality of users. In many embodiments, the plurality of users can comprise the user and the data can comprise historical online behavior associated with the at least the portion of the plurality of users. In some embodiments, the historical online behavior can comprise at least one of: a user search query, a view of an item of the item set, a click on the item of the item set, an add-to-cart of the item of the item set, or a purchase of the item of the item set. In some embodiments, the historical online behavior can comprise a length of time a user of the at least the portion of the plurality of users viewed an item of the item set. In some embodiments, the data associated with the at least the portion of the plurality of users can comprise one or more user profiles associated with the at least the portion of the plurality of users. In various embodiments, the one or more user profiles can comprise demographic information associated with the related one or more users, likes and dislikes associated with the related one or more users, and/or shopping, pickup, and delivery preferences associated with the related one or more users.

In a number of embodiments, method 500 can further comprise processing data associated with the user of the plurality of users from the browse session by determining one or more first keywords by capturing the one or more first keywords associated with the search query of the user of the plurality of users (e.g., the search query received in activity 505) during the time window.

In a number of embodiments, method 500 can further comprise processing data associated with the user of the plurality of users from the browse session by creating a feature set of data associated with at least a portion of the plurality of users and/or creating a text corpus comprising the search query of the user of the plurality of users (e.g., the search query received in activity 505) and an item activity associated with the browse session. In some embodiments, method 500 can further comprise processing data associated with the user of the plurality of users from the browse session by clustering a search set based at least in part on the one or more first keywords and clustering an item set comprising the one or more items.

In a number of embodiments, method 500 can further comprise processing data associated with the user of the plurality of users from the browse session by determining the one or more items by capturing the one or more items (e.g., the one or more items received in activity 510) associated with the search query of the user of the plurality of users.

In various embodiments, method 500 can further comprise an activity of determining an item vector representation representing the item set and/or determining a keyword vector representation representing the search set. In some embodiments, method 500 can comprise an activity of determining a first set of items of the item set as being associated with the search query based at least in part on the item vector representation and the keyword vector representation.

In some embodiments, natural language modeling can be used to learn vector representation of the search query (e.g., item vector representation and/or the keyword vector representation). In some embodiments, the natural language modeling can comprise one-hot representation of the keywords (e.g., the keywords in the vocabulary of a size V, wherein each input keyword vector is of a size $V_i$ and an output keyword vector is of a size $V_o$). In some embodiments, an input to the natural language modeling can be a word from the search query, and the output can be a context of the word. As a non-limiting example, if a browse session comprises the following search queries and/or item activity, for a search query "q" in a browse session at time "t," a time window size "S" can be selected. Any item activity from time "t+1" can be considered as context for the browse session.

```
{
    "1":    "homepage",
    "2":    "category Page",
    "3":      "View item1",
    "4":      "search frozen toys",
    "5":      "category Page",
    "6":      "search frozen dolls",
    "7":      "View item2",
    "8":      "add item2 to cart",
    "9":      "view item3",
    "10":     "add item3 to cart",
    "11":     "checkout with item2, item3"
}
```

For a time window of size=5 and a search query of "Frozen toys," only the 5 subsequent actions by the user after the search query of "Frozen toys" can be considered as the context of the browse session. In many embodiments, preceding item activity is not considered as context for the browse session.

In many embodiments, method 500 can further comprise training a neural net model to provide context of the browse session. In some embodiments, Stochastic Gradient Descent can be used to train the neural net model. In various embodiments, a vocabulary size "V" can comprise the one or more first keywords associated with the search query and the one or more items captured by the search query. In some embodiments, the neural net model can comprise a hidden layer size "N," a window size "S," and the model can comprise the following matrix structure: $[1 \times V] \to [V \times N] \to [1 \times N] \to [S \times N] \to [N \times V] \to [S \times V]$.

In some embodiments, the input is a one-hot encoded vector, which can mean that for a given input word, only one out of V units, $\{x_i, \ldots, x_i\}$, will be 1, and all other units are 0. The [V×N] matrix can be the weight matrix W between an input layer and the hidden layer whose $j^{th}$ row can represent one or more weights corresponding to the $j^{th}$ word in the vocabulary. Hence, this weight matrix can provide the vector representations of all words in the vocabulary.

In many embodiments, method 500 can further comprise determining one or more nearest items and/or one or more nearest previous search queries (e.g., the one or more previous search queries received in activity 515) by identifying clusters and/or clustering the search set based at least in part on the one or more first keywords, and clustering an item set comprising the one or more items. In many embodiments, the search query can be expanded based at least in part on the identifying clusters and/or clustering the search set based at least in part on the one or more first keywords and clustering an item set comprising the one or more items. In various embodiments, natural language processing and understanding can be used to expand the search query and augment precision of cluster similarity.

In various embodiments, method 500 can further comprise an activity 520 of determining a purchase probability associated with a first item of the one or more items based at least in part on a first item score for the first item. In some embodiments, the first item score can be based at least in part on item activity associated with the first item from previous search queries. In some embodiments, activity 520 can further comprise determining a purchase probability associated with a second item of the one or more items based at least in part on a second item score for the second item. In some embodiments, activity 520 can further comprise determining a purchase probability associated with a third item of the one or more items based at least in part on a third item score for the third item. In some embodiments, activity 520 can further comprise determining a purchase probability associated with a fourth item of the one or more items based at least in part on a fourth item score for the fourth item. In some embodiments, the purchase probability can comprise a probability that a user will purchase a particular item (e.g., the first, second, third, and/or fourth item of the one or more items) on a given day (e.g., the present day of the browse session). In some embodiments, activity 520 of determining a purchase probability associated with a first item of the one or more items based at least in part on a first item score for the first item can comprise training a multinomial logistic regression model.

In a number of embodiments, method 500 can further comprise an activity 525 of ranking the one or more items based at least in part on the purchase probability associated with the first item of the one or more items.

In many embodiments, method 500 can further comprise an activity 530 of facilitating display of the one or more items on the webpage. The one or more items can be arranged on the webpage pursuant to a ranking of one or more items, and the ranking can be based, at least in part, on the webpage personalization described herein.

The other variations described below for method 600 (FIG. 6), method 700 (FIG. 7), method 800 (FIG. 8) and/or method 900 (FIG. 9) also can apply here to method 500.

Figure 6:
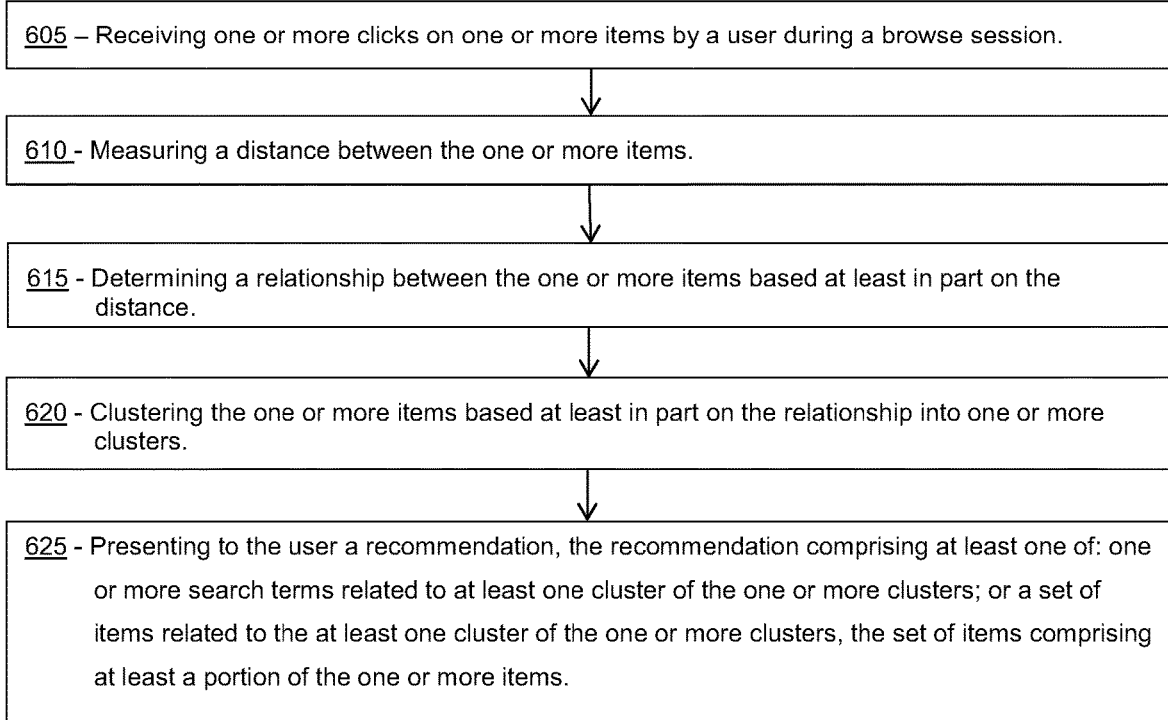
FIG. 6 illustrates a flowchart for another method, according to another embodiment.

FIG. 6 illustrates a flow chart for a method 600, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules 412, 414, 422, 424 and/or 462 (FIG. 4). Such non-transitory memory storage modules can be part of a computer system such as search system 310 (FIGS. 3 & 4), personalization system 320 (FIGS. 3 & 4), and/or display system 360 (FIGS. 3 & 4). The processing module(s) can be similar or identical to the processing module(s) described above with respect to computer system 100 (FIG. 1). In many embodiments, method 600 can be similar to method 500 (FIG. 5), method 700 (FIG. 7), and/or method 800 (FIG. 8). In many embodiments, portions of method 500 (FIG. 5), method 700 (FIG. 7), method 800 (FIG. 8) and/or method 900 (FIG. 9) can be used within method 600.

In many embodiments, method 600 can be a method for personalizing web pages based on user intent and relevance from search terms. For example, method 600 can comprise an activity 605 of receiving one or more clicks on one or more items by a user during a browse session. In many embodiments, activity 605 can comprise receiving item activity associated with the browse session. In some embodiments, item activity associated with the browse session that does not comprise a search query can be labeled as "noSearch."

In many embodiments, method 600 can further comprise an activity 610 of measuring a distance between the one or more items. In many embodiments, activity 610 of measuring the distance between the one or more times can comprise measuring a similarity between the one or more items. In some embodiments, activity 610 of measuring the distance between the one or more times can comprise measuring a Jaccard index between the one or more items. In some embodiments, activity 610 can be based at least in part on determining an item vector representation representing the item set and/or determining a keyword vector representation representing the search set, similar to method 500 described above.

In some embodiments, method 600 can further comprise an activity 615 of determining a relationship between the one or more items based at least in part on the distance. In some embodiments, activity 615 can be based at least in part on determining an item vector representation representing the item set and/or determining a keyword vector representation representing the search set, similar to method 500 described above. In many embodiments, the relationship between the one or more items can comprise a coefficient of similarity or a Jaccard coefficient. In some embodiments, activity 615 can further comprise determining that a number of the one or more clicks meets or exceeds a predetermined threshold before presenting to the user the recommendation. In some embodiments, the predetermined threshold can be approximately 1-30 item clicks. An advantage of determining a relationship between the one or more items based at least in part on the distance is that a higher number of clicks on items with similarity or a close distance can indicate that the user knows what he is searching for, but cannot determine the correct search term (e.g., a user can enter a search query of "shoes" and can click a number of times on shoes with closed lacing, in which case the method can determine that the user is searching for "Oxford shoes" and can present the term as a recommendation for a subsequent search). Another advantage of determining the relationship between the one or more items based at least in part on the distance is that a high number of clicks on dissimilar items can indicate that the user is browsing and, in some embodiments, a recommendation is not presented.

In some embodiments, activity 615 can further comprise creating a text corpus similar to the text corpus described above in method 500, the text corpus comprising the search query of the user of the plurality of users and/or an item activity associated with the browse session (e.g., the text clicks received in activity 605). In various embodiments, activity 615 can further comprise an activity of determining an item vector representation representing the item set and/or determining a keyword vector representation representing the search set, similar to method 500 described above. In many embodiments, a natural language model can be used to determine the item vector representation representing the item set and/or the keyword vector representation representing the search set. In some embodiments, the natural language model can use high dimensional embedding for feature representation within the item vector representation representing the item set and/or the keyword vector representation representing the search set. In some embodiments, the high dimensional representation can be tuned to a model causality (e.g., an abstract model that describes causal mechanism of a system).

In various embodiments, method 600 can further comprise an activity 620 of clustering the one or more items based at least in part on the relationship into one or more clusters. In many embodiments, activity 620 of clustering the one or more items based at least in part on the relationship into one or more clusters can be similar to clustering a search set and/or clustering an item set as described above in method 500.

In many embodiments, method 600 can further comprise training a recurrent neural network model (e.g., a long short-term memory recurrent neural network architecture) to predict a next action (e.g., item activity or search query) the user can perform, given one or more actions (e.g., item activity, search query, past history, and/or past actions) during the browse session. In many embodiments, method 600 can predict a probability of a user performing a given action in view of the user's previous actions. In some embodiments, the browse session can be divided into one or more chunks "N," with each chunk "N" having a minimum length of time. In some embodiments, the minimum length of time can comprise 1 time unit (e.g., the time unit can be correlated to a number of seconds or minutes the user spent in the browse session). In some embodiments, the probability of a user performing the given action can be based at least in part on a density estimate. In some embodiments, the density can be estimated at point "x" according to the following formula:

$$p(x)=(k*a)/(v*n),$$

wherein, "v" is a volume of hypercube surrounding "x", "n" is a total number of points, "k" is a number of query points inside "v", "a" is a number of items out of "m" number of items the user has interacted with (e.g., item activity) during the browse session that are present inside "v." In many embodiments, a total density p{x} can be calculated for all "m" items. In some embodiments, a highest density within p{x} can be selected and the candidate queries can be returned (e.g., recommended in activity 625, described below). Similarly, in some embodiments, a probability score of the user performing one or more actions (e.g., item activity) can be determined for searches at a time "t," given the one or more actions (e.g., item activity) the user has performed at time "t−1."

In some embodiments, method 600 can further comprise an activity 625 of presenting to the user a recommendation. In many embodiments, the recommendation can comprise one or more search terms related to at least one cluster of the one or more clusters and/or or a set of items related to the at least one cluster of the one or more clusters, the set of items comprising at least a portion of the one or more items. In a number of embodiments, the recommendation is presented only after the user has returned to a homepage. One reason for limiting the presentation in this way is that when the user returns to the homepage, it can signal that the user is done with the previous search, and/or was not satisfied with the previous search. In which case, a recommendation can assist the user in efficiently completing a new search. In a number of embodiments, activity 625 can further comprise an activity of receiving a search query from the user during the browse session. In many embodiments the browse session can be similar to the browse session of method 500. In some embodiments, activity 625 can further comprise an activity of updating the one or more clusters based at least in part on the search query. In many embodiments, activity 625 can further comprise evaluating a past history of one or more past actions of the user and/or other users in a previous browse session and updating the one or more clusters based at least in part on the past history of the one or more past actions of the user and/or other users. In some embodiments, the one or more past actions can comprise one or more other search queries by the user and/or other users, one or more item clicks by the user and/or other users, one or more items added-to-cart by the user and/or other users, and/or one or more item purchases by the user and/or other users. In many embodiments, based on the time period of the browse session and the one or more items the user has interacted (e.g., item activity) with during the time session, an intent of the user can be determined. In some embodiments, if the user interacts with one or more items such that it is determined that the user has a click rate (e.g., a rate at which the user clicks on one or more items) or bounce rate (e.g., a rate at which the user leaves a webpage or one or more items) above the predetermined threshold, the intent of the user can be determined to comprise browsing and searching more, and therefore the recommendation can comprise one or more new search term (e.g., search query and/or search topic).

In some embodiments, the probability score for one or more potential queries or recommendations (e.g., recommended in activity 625, described below) can be used to re-rank the one or more potential queries or recommendations (e.g., recommended in activity 625, described below). In some embodiments, a recommended query with a highest probability score can be ranked first, and therefore recommended first. In some embodiments, only recommendations with a probability score that reaches or exceeds a predetermined threshold can be presented to the user. In some embodiments, the predetermined threshold can comprise a probability score of approximately 0.5 or 50 percent.

In many embodiments, method 600 can further comprise evaluating a user profile of the user and updating the one or more clusters based at least in part on the user profile of the user. In some embodiments, the user profile can comprise a past history of the user. In many embodiments, the past history can comprise a browse history, a search history, a purchase history, an item add-to-cart history, and/or an item click history. In many embodiments, method 600 can further comprise updating the user profile when the user clicks on the recommendation. In some embodiments, method 600 can further comprise updating the user profile when the user adds a recommended item or an item from a recommended search term to a checkout cart and/or purchases the recommended item or the item from a recommended search term.

In some embodiments, method 600 can further comprise presenting a question to the user based at least in part on the one or more clicks on the one or more items and updating the one or more clusters based at least in part on an answer to the question presented similar to method 700 (FIG. 7).

The other variations described above for method 500 (FIG. 5) or below for method 700 (FIG. 7), method 800 (FIG. 8), and/or method 900 (FIG. 9) also can apply here to method 600.

FIG. 7 illustrates a flow chart for a method 700, according to an embodiment. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of method 700 can be performed in any suitable order. In still other embodiments, one or more of the activities of method 700 can be combined or skipped. In many embodiments, system 300 (FIG. 3) can be suitable to perform method 700 and/or one or more of the activities of method 700. In these or other embodiments, one or more of the activities of method 700 can be implemented as one or more computer instructions configured to run at one or more processing modules and configured to be stored at one or more non-transitory memory storage modules 412, 414, 422, 424 and/or 462 (FIG. 4). Such non-transitory memory storage modules can be part of a computer system such as search system 310 (FIGS. 3 & 4), personalization system 320 (FIGS. 3 & 4), and/or display system 360 (FIGS. 3 & 4). The processing module(s) can be similar or identical to the processing module(s) described above with respect to computer system 100 (FIG. 1). In many embodiments, method 700 can be similar to method 500 (FIG. 5), method 600 (FIG. 6), and/or method 800 (FIG. 8). In many embodiments, portions of method 500 (FIG. 5), method 600 (FIG. 6), method 800 (FIG. 8) and/or method 900 (FIG. 9) can be used within method 700.

In many embodiments, method 700 can be a method for personalized query suggestions using browsing patterns. For example, method 700 can comprise an activity 705 of receiving a search query from a search by a user. In many embodiments, activity 605 can be similar to activity 505 (FIG. 5).

In many embodiments, method 700 can further comprise an activity 710 of determining a question to present to the user. In many embodiments, activity 710 can further comprise determining the question to present to the user by, for example, evaluating a user profile associated with the user, evaluating the search query, evaluating one or more user actions during a current browse session of the user, and/or selecting the question from a set of questions. In many embodiments, the current browse session can be referred to as a browse session similar to as described above in method 500. In many embodiments, the one or more user actions can be similar to an item activity as described above. In some embodiments, the one or more user actions can be one or more other search queries by the user and/or other users, one or more item clicks by the user and/or other users, one or more items added-to-cart by the user and/or other users, or one or more item purchases by the user and/or other users.

In some embodiments, method 700 can further comprise an activity 715 of presenting the question to the user when a confidence score associated with the question reaches or exceeds a predetermined threshold. In some embodiments, the confidence score can be based at least in part on a user profile of the user. In many embodiments, the user profile can comprise a past history of the user. In some embodiments, method 700 can further comprise an activity of evaluating a past history of purchases by the user and/or other users. In some embodiments, the past history can comprise a browse history, a search history, a purchase history, an item add-to-cart history, and/or an item click history.

In some embodiments, the confidence score can be based at least in part on a grouping of the user within a set of users. In some embodiments, one or more users who have created a baby registry can be grouped in a "new mom" grouping. In some embodiments, a confidence score for a user who has been grouped in a "new mom" grouping (e.g., has created a baby registry) can be higher than a confidence score for a user who has recently purchased an item off of a baby registry (e.g., a guest at a baby shower). This is example, the confidence score for the user who has been grouped in a "new mom" grouping is more likely to have reached or exceeded the predetermined threshold for presenting a question associated with newborn babies.

In some embodiments, the predetermined threshold can be lower for asking a first-type question than for asking a second-type question. In some embodiments, questions can be tiered in a taxonomy, with questions in higher numbered tiers comprising more detailed information. In some embodiments, the first tier comprises category-level questions. In some embodiments, the second tier and/or higher tier comprise questions related to details of the one or more items. In some embodiments, a first-type question can be a question with a second tier or higher question (e.g., a question associated with personal demographic information of the user or associated with an attribute of an item such as "are you searching for a 60" television?") while a second-type question can be a first tier question (e.g., a question associated with a category of items or interests, such as "are you searching for a television?"). In some embodiments, a user with a user profile that is approximately 50 percent or more complete can be asked second-type questions, while a user with a user profile that is less than approximately 50 percent complete can be asked first-type questions. An advantage of using a predetermined threshold to determine a type of question is that it increases efficiency by decreasing the use of resources by decreasing the number of tiers within the taxonomy to search.

In some embodiments, an answer to the question presented can be stored in the user profile of the user. In many embodiments, method 700 can further comprise selecting a question based at least in part on the user profile of the user. An advantage of storing the answer to the question presented in the user profile is that it prevents a question from being presented more than once to a user, this efficiency can decrease the use of resources and efficiently store information in memory for use later.

In many embodiments, the question can be presented in order to increase the efficiency of the search and/or to provide an improved search experience to the user. Improving the efficiency of the search can decrease the use of resources, including computer network bandwidth, by decreasing the number of categories or taxonomies within the item inventory or website to search once a directed question has been presented and answered.

In some embodiments, the question can be presented during a transition time during the browse session. In some embodiments, the transition time can comprise a time when the click rate and/or bounce rate reaches or exceeds a predetermined threshold, and/or a time when the user is entering or running a new search query. In some embodiments, the predetermined threshold for the bounce rate can comprise when the user has clicked on at least approximately 5-30 items. In some embodiments, the predetermined threshold for the bounce rate can comprise when the user has viewed an item for less than approximately 2-5 seconds. In many embodiments, the question is not presented during a time when the user is adding one or more items to the cart and/or during a checkout time. In a number of embodiments, the question can be presented in a dialog box, a banner, an email, a text message, or a pop-up box.

In some embodiments, method 700 can further comprise determining the set of questions by extracting text from one or more advertisements.

The other variations described above for method 500 (FIG. 5) and method 600 (FIG. 6) or below for method 800 (FIG. 8) and/or method 900 (FIG. 9) also can apply here to method 700.

FIG. 8 illustrates a flow chart for a method 800, according to an embodiment. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIG. 3) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules 412, 414, 422, 424 and/or 462 (FIG. 4). Such non-transitory memory storage modules can be part of a computer system such as search system 310 (FIGS. 3 & 4), personalization system 320 (FIGS. 3 & 4), and/or display system 360 (FIGS. 3 & 4). The processing module(s) can be similar or identical to the processing module(s) described above with respect to computer system 100 (FIG. 1). In many embodiments, method 800 can be similar to method 500 (FIG. 5), method 600 (FIG. 6), and/or method 700 (FIG. 7). In many embodiments, portions of method 500 (FIG. 5), method 600 (FIG. 6), method 700 (FIG. 7), and/or method 900 (FIG. 9) can be used within method 800.

In many embodiments, method 800 can comprise an activity 805 of storing one or more user actions of a user of one or more users in a database. In many embodiments, the one or more user actions can comprise actions similar to item activity as described above in method 500 (FIG. 5). In many embodiments, the one or more user actions can comprise one or more other search queries by the user and/or other users, one or more item clicks by the user and/or other users, one or more items added-to-cart by the user and/or other users, a time spent on a webpage by the user and/or other users, and/or a bounce rate; or one or more item purchases by the user and/or other users. In many embodiments, the one or more users can comprise the other users.

In many embodiments, method 800 can further comprise an activity 810 of sorting the one or more user actions into one or more user action types. In some embodiments, the one or more user action types can comprise a one or more of search, a search query, a click, an add-to-cart, a view time, or a purchase.

In some embodiments, method 800 can further comprise an activity 815 of extracting one or more correlated signals related to the one or more user actions of the user of the one or more users based at least in part on the one or more user action types to determine one or more independent signals related to the one or more user actions of the user of the one or more users. In one embodiment, activity 815 can comprise using a Mahalanobis transformation $\Sigma^{-1/2} a_i$ to transform a vector $a_i$, wherein $a_i$ is the vector of the one or more user actions by an $i^{th}$ user of the one or more users to determine the one or more independent signals related to the one or more user actions of the user of the one or more users (e.g., to produce independent signals of uniform variability). In some embodiments, when the actions are correlated, the dimension of vector $a_i$ can be reduced.

In various embodiments, method 800 can further comprise an activity 820 of averaging the one or more independent signals related to the one or more user actions of the user to determine a personalization score related to the user of the one or more users. In some embodiments, activity 820 can comprise averaging using the formula:

$$\mu^{relevant} = \frac{1}{n} \sum_{i=1}^{n} \Sigma^{-1/2} a_i = \Sigma^{-1/2} \mu$$

wherein $\mu$ is the mean vector of the one or more user actions, $a_i$ is the vector of the one or more user actions by an $i^{th}$ user of the one or more users, $\Sigma^{-1/2}$ is the ZCA-Mahalanobis whitening matrix, n is a total number of the one or more users and $\mu^{relevant}$ is an average vector of relevant signals. In many embodiments, each component of the average vector of relevant signals $\mu^{relevant}$ can independently measure at least one aspect of an average quality of a user experience. In some embodiments, activity 820 can comprise determining a weighted average of the average vector of one or more independent signals (e.g., the relevant signals). In some embodiments, determining the weighted average can comprise selecting one or more weights which can be dependent on one or more predetermined goals (e.g., increase traffic to an advertisement campaign). In some embodiments, in the absence of predetermined goals, each signal of the one or more independent signals can be weighted equally. An advantage of measuring the average quality of the user experience comprises increasing search efficiency while increasing a likelihood of engaging the user more effectively in order to meet the user's needs.

In many embodiments, method 800 further can comprise an activity 825 of applying a weighted average on the average vector of the one or more one or more independent signals (e.g., the relevant signals) to obtain a personalization score. In some embodiments, the weighted average can be applied on the average vector using the following method

| User ID | Clicks | Revenue |
|---------|--------|---------|
| 1 | 0 | 20 |
| 2 | 1 | 0 |
| 3 | 2 | 0 |
| 4 | 0 | 0 |

Wherein:

Click mean=$(¼)*(0+1+2+0)=¾$;

Revenue mean=$(¼)*(20+0+0+0)=5$;

Click variance=$(¼)*[(0-¾)^2+(1-¾)^2+(2-¾)^2+(0-¾)^2]=0.6875$;

Revenue variance=$¼[(20-5)^2+(0-5)^2+(0-5)^2+(0-5)^2]=75$;

Click-revenue covariance=$¼[(0*20-¾*5)+(1*0-¾*5)+(2*0-¾*5)+(0*0-¾*5)]=-15/4$;

Mean vector($\mu$)=[0.75,5];

Co-variance metric($\Sigma$)=[[0.6875,-15/4][-15/4,75]]; and

Customers $n=4$;

$\Sigma^{(-1/2)}$=[[1.41270502,0.06530326],[0.06530326, 0.11861205]];

The average vector of independent relevant signals of quality of user experience=$\mu^{relevant}=\Sigma^{(-1/2)}\mu$=[1.386045, 0.6420377]. When each signal of the one or more independent signals is weighted equally, the personalization score is =½*1.386045+½*0.6420377=1.0140. In some embodiments, the recommendation can be personalized to increase another variable, such as revenue. For example, let R_t be the revenue on t-th day and $\mu^1_t$ and $\mu^2_t$ are the first and second independent signals for the t-th day. Then, through regression:

$R\_t=2*\mu^1_t+3*\mu^2_t+\varepsilon_t$

The weights can then change accordingly and the personalization score can be computed as =⅖*1.386045+⅗*0.6420377=0.9396406

In many embodiments, method 800 can further comprise an activity 830 of updating a webpage for the user based at least in part on the personalization score. In some embodiments, method 800 can further comprise an activity of amending a campaign (e.g., decreasing emails to the user, increasing emails to the user, changing an advertisement on the webpage, and/or suggesting one or more search terms or queries) when the personalization score is below a predetermined threshold.

In some embodiments, method 800 further can comprise presenting a question to the user based at least in part on the one or more actions of the user of the one or more users and/or when the personalization score is below a predetermined threshold, similar to method 700 (FIG. 7) and/or method 600 (FIG. 6), as described above. In some embodiments, method 800 can comprise updating a user profile of a user of one or more users based at least in part on a determination of a personalization score of the user of the one or more users. In some embodiments, method 800 further can comprise updating a user profile of the user the personalization score reaches or exceeds a predetermined threshold.

The other variations described above for method 500 (FIG. 5), method 600 (FIG. 6) and/or method 700 (FIG. 7), or below for method 900 (FIG. 9) also can apply here to method 800.

FIG. 9 illustrates a flow chart for a method 900, according to an embodiment. Method 900 is merely exemplary and is not limited to the embodiments presented herein. Method 900 can be employed in many different embodiments or examples not specifically depicted or described herein. In some embodiments, the activities of method 900 can be performed in the order presented. In other embodiments, the activities of method 900 can be performed in any suitable order. In still other embodiments, one or more of the activities of method 900 can be combined or skipped. In many embodiments, system 300 (FIG. 3) can be suitable to perform method 900 and/or one or more of the activities of method 900. In these or other embodiments, one or more of the activities of method 900 can be implemented as one or more computer instructions configured to run at one or more processing modules and configured to be stored at one or more non-transitory memory storage modules 412, 414, 422, 424 and/or 462 (FIG. 4). Such non-transitory memory storage modules can be part of a computer system such as search system 310 (FIGS. 3 & 4), personalization system 320 (FIGS. 3 & 4), and/or display system 360 (FIGS. 3 & 4). The processing module(s) can be similar or identical to the processing module(s) described above with respect to computer system 100 (FIG. 1). In many embodiments, method 900 can be similar to method 500 (FIG. 5), method 600 (FIG. 6), and/or method 800 (FIG. 8). In many embodiments, portions of method 500 (FIG. 5), method 600 (FIG. 6), and/or method 800 (FIG. 8) can be used within method 700.

In many embodiments, method 900 can be a method for personalized query suggestions using one or more online activities of the user. In many embodiments, method 900 can be similar to method 700 (FIG. 7). For example, method 900 can comprise an activity 905 of receiving one or more online activities of a user. In many embodiments, activity 905 can be similar to activity 705 (FIG. 7). In some embodiments, the one or more online activities can be similar to item activity as discussed above. In some embodiments, activity 905 can comprise capturing and/or receiving one or more user segments associated with the user, the one or more user segments can comprise demographics of the user, likes and/or dislikes of the user, and/or preferred brands or items of the user.

In many embodiments, method 900 further can comprise an activity 910 of determining one or more questions associated with the one or more online activities of the user. In many embodiments, activity 910 can be similar to activity 710 (FIG. 7). In many embodiments, natural language processing can be used to determine the one or more questions. For example, one or more questions can be identified as combination of subject, object and/or predicate phrases. The natural language processing model can help build related questions from set of subjects, objects and predicates for a given vocabulary. In some embodiments, method 900 also can comprise an activity 915 of classifying the one or more questions into one or more tiers. In many embodiments, activity 915 can be used as a representative to classify questions based on parameters such as vagueness. For example, question "are you looking for new shoes?" is vaguer than the question "are you looking for Nike shoes?"

In some embodiments, method 900 further can comprise an activity 920 of building a model, wherein the model predicts a probability associated with each of the one or more questions. In many embodiments, activity 920 can comprise building vector embedding of the one or more online activities. In some embodiments, activity 920 further can predict a user intent of the user in the current browse session based at least in part on high dimensional embedding for search queries and item browse by the user and/or other users. In various embodiments, activity 920 further can comprise training a supervised model such as deep neural network to predict relevant questions from activity 920 for given online activities, user intent and/or user segments as the input vector to the neural network. For example, the model can intelligently identify a question like "would you like to browse latest games for your new Xbox?" by knowing that the user recently purchased an Xbox and has shown user intent to browse and/or search for games based at least in part on the one or more online activities of the user.

In some embodiments, method 900 further can comprise an activity 925 of presenting at least one of the one or more questions to the user based at least in part on the probability of each of the one or more questions. In many embodiments, activity 925 can be similar to activity 715 (FIG. 7). In some embodiments, activity 925 can comprise presenting the at least one of the one or more questions to the customer during the browse session or through other communication mediums, such as email.

In a number of embodiments, method 900 further can comprise an activity 930 of updating the model based at least in part on feedback from the user. In many embodiments, activity 930 further can comprise tracking engagement data of the user with the at least one of the one or more questions in form of views, clicks, and/or activities after clicks, etc. In many embodiments, the engagement data can be used to train reinforcement learning models and/or feedback loop for the same user and also for other user whose online activities, user intent, and/or user segments are comprise similarities to those of the user.

The other variations described above for method 500 (FIG. 5), method 600 (FIG. 6), method 700 (FIG. 7), and/or method 800 (FIG. 8) also can apply here to method 900.

Returning to FIG. 4, FIG. 4 illustrates a block diagram of a portion of system 300 comprising search system 310, personalization system 320, and/or display system 360, according to the embodiment shown in FIG. 3. Each of search system 310, personalization system 320, and/or display system 360 are merely exemplary and are not limited to the embodiments presented herein. Each of search system 310, personalization system 320, and/or display system 360 can be employed in many different embodiments or examples not specifically depicted or described herein. In some embodiments, certain elements or modules of search system 310, personalization system 320, and/or display system 360 can perform various procedures, processes, and/or acts. In other embodiments, the procedures, processes, and/or acts can be performed by other suitable elements or modules.

In many embodiments, search system 310 can comprise non-transitory memory storage modules 412 and 414, personalization system 320 can comprise non-transitory memory storage modules 422 and 424, and display system 360 can comprise a non-transitory memory storage module 462. Memory storage module 412 can be referred to as a browse module 412 and memory storage module 414 can be referred to as a search module 414. Memory storage module 422 can be referred to as a probability module 422 and memory storage module 424 can be referred to as a recommendation module. Memory storage module 462 can be referred to as an image module 462.

In many embodiments, browse module 412 can store computing instructions configured to run on one or more processing modules and perform one or more acts of methods 500 (FIG. 5) (e.g., activity 505), one or more acts of method 600 (FIG. 6) (e.g., activity 605), one or more acts of method 700 (e.g., activity 705), one or more acts of method 800 (e.g., activity 805), and/or one or more acts of method 900 (e.g., activity 905).

In some embodiments, search module 414 can store computing instructions configured to run on one or more processing modules and perform one or more acts of methods 500 (FIG. 5) (e.g., activity 510 and/or activity 515), one or more acts of method 600 (FIG. 6) (e.g., activity 605), one or more acts of method 700 (e.g., activity 705), one or more acts of method 800 (e.g., activity 805), and/or one or more acts of method 900 (e.g., activity 905).

In many embodiments, probability module 422 can store computing instructions configured to run on one or more processing modules and perform one or more acts of methods 500 (FIG. 5) (e.g., activity 520), one or more acts of method 600 (FIG. 6) (e.g., activity 610, activity 615, and/or activity 620), one or more acts of method 700 (e.g., activity 710), one or more acts of method 800 (e.g., activity 810, activity 815, activity 820 and/or 825), and/or one or more acts of method 900 (e.g., activity 910, activity 915, activity 920, and/or activity 925).

In many embodiments, recommendation module 424 can store computing instructions configured to run on one or more processing modules and perform one or more acts of methods 500 (FIG. 5) (e.g., activity 525), one or more acts of method 600 (FIG. 6) (e.g., activity 625), one or more acts of method 700 (e.g., activity 710), and/or one or more acts of method 800 (e.g., activity 830), and/or one or more acts of method 900 (e.g., activity 925).

In some embodiments, image module 462 can store computing instructions configured to run on one or more processing modules and perform one or more acts of methods 500 (FIG. 5) (e.g., activity 530), one or more acts of method 600 (FIG. 6) (e.g., activity 625), one or more acts of method 700 (e.g., activity 715), and/or one or more acts of method 800 (e.g., activity 825) and/or one or more acts of method 900 (e.g., activity 925).

Although systems and methods for search result comparison been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the activities of FIGS. 5-9 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processing modules; and
one or more non-transitory storage modules storing computing instructions configured to run on the one or more processing modules and perform:
receiving two or more clicks on two or more items by a user during a browse session;
measuring a distance between the two or more items;
determining a relationship between the two or more items based at least in part on the distance;
clustering the two or more items based at least in part on the relationship into two or more clusters;
after the user has returned to a homepage indicating an end to the browse session, automatically presenting to the user a recommendation for a new browse session, the recommendation comprising at least one of:
one or more search terms related to at least one cluster of the two or more clusters; or
a set of items related to the at least one cluster of the two or more clusters, the set of items comprising at least a portion of the two or more items; and
receiving from the user a new search in the new browse session based on the recommendation.

2. The system of claim 1, wherein:
the one or more non-transitory storage modules storing the computing instructions are configured to run on the one or more processing modules and further perform:
updating the two or more clusters based at least in part on the new search.

3. The system of claim 1, wherein:
the one or more non-transitory storage modules storing the computing instructions are configured to run on the one or more processing modules and further perform:
evaluating a past history of one or more past actions of the user in a previous browse session; and
updating the two or more clusters based at least in part on the past history of the one or more past actions of the user.

4. The system of claim 3, wherein:
the one or more past actions comprise at least one of:
one or more other search queries by the user;
two or more item clicks by the user;
two or more items added-to-cart by the user; or
two or more item purchases by the user.

5. The system of claim 1, wherein:
the one or more non-transitory storage modules storing the computing instructions are configured to run on the one or more processing modules and further perform:
evaluating a user profile of the user; and
updating the two or more clusters based at least in part on the user profile of the user.

6. The system of claim 5, wherein:
the user profile comprises a past history of the user, the past history comprising at least one of:
a browse history;
a search history;
a purchase history;
an item add-to-cart history; or
an item click history.

7. The system of claim 1, wherein:
the one or more non-transitory storage modules storing the computing instructions are configured to run on the one or more processing modules and further perform:
determining that a number of clicks meets or exceeds a predetermined threshold before presenting to the user the recommendation.

8. The system of claim 1, wherein when the recommendation comprises the one or more search terms:
the one or more search terms comprise a new search query or a new search topic.

9. A method comprising:
receiving two or more clicks on two or more items by a user during a browse session;
measuring a distance between the two or more items;
determining a relationship between the two or more items based at least in part on the distance;
clustering the two or more items based at least in part on the relationship into two or more clusters;
after the user has returned to a homepage indicating an end to the browse session, automatically presenting to the user a recommendation for a new browse session, the recommendation comprising at least one of:
one or more search terms related to at least one cluster of the two or more clusters; or
a set of items related to the at least one cluster of the two or more clusters, the set of items comprising at least a portion of the two or more items; and
receiving from the user a new search in the new browse session based on the recommendation.

10. The method of claim 9, further comprising:
updating the two or more clusters based at least in part on the new search.

11. The method of claim 9, further comprising:
evaluating a past history of one or more past actions of the user in a previous browse session; and
updating the two or more clusters based at least in part on the past history of the one or more past actions of the user.

12. The method of claim 11, wherein:
the one or more past actions comprise at least one of:
one or more other search queries by the user;
two or more item clicks by the user;

two or more items added-to-cart by the user; or
two or more item purchases by the user.

13. The method of claim 9, further comprising:
evaluating a user profile of the user; and
updating the two or more clusters based at least in part on the user profile of the user.

14. The method of claim 13, wherein:
the user profile comprises a past history of the user, the past history comprising at least one of:
a browse history;
a search history;
a purchase history;
an item add-to-cart history; or
an item click history.

15. The method of claim 9, further comprising:
determining that a number of clicks meets or exceeds a predetermined threshold before presenting to the user the recommendation.

16. The method of claim 9, wherein the recommendation further comprises:
the one or more search terms comprise a new search query or a new search topic.

17. The method of claim 9, further comprising:
updating a user profile when the user clicks on the recommendation.

18. A method comprising:
receiving two or more clicks on two or more items by a user during a browse session;
updating a user profile of the user based at least in part on the two or more clicks on the two or more items by the user;
clustering the two or more items based at least in part on a relationship into two or more clusters by:
measuring a distance between the two or more items; and
determining the relationship between the two or more items based at least in part on the distance;
after the user has returned to a homepage indicating an end to the browse session, automatically presenting to a user one or more search terms related to a cluster of items for a new browse session, which are based at least in part on the relationship;
updating the user profile of the user again when the user clicks on at least one of the one or more search terms; and
receiving from the user a new search in the new browse session based on at least the one or more search terms.

19. The method of claim 18, further comprising:
evaluating a past history of one or more past actions of the user in a previous browse session; and
updating the two or more clusters based at least in part on the past history of the one or more past actions of the user,
wherein:
the one or more past actions comprise at least one of:
one or more other search queries by the user;
two or more item clicks by the user;
two or more items added-to-cart by the user; or
two or more item purchases by the user; and
the user profile comprises a past history of the user, the past history comprising at least one of:
a browse history;
a search history;
a purchase history;
an item add-to-cart history; or
an item click history.

20. The method of claim 18, further comprising:
determining that a number of clicks meets or exceeds a predetermined threshold before presenting to the user the recommendation.

* * * * *